Oct. 23, 1928.
W. L. KANN
BATTERY SEPARATOR
Filed Nov. 15, 1927
1,688,336
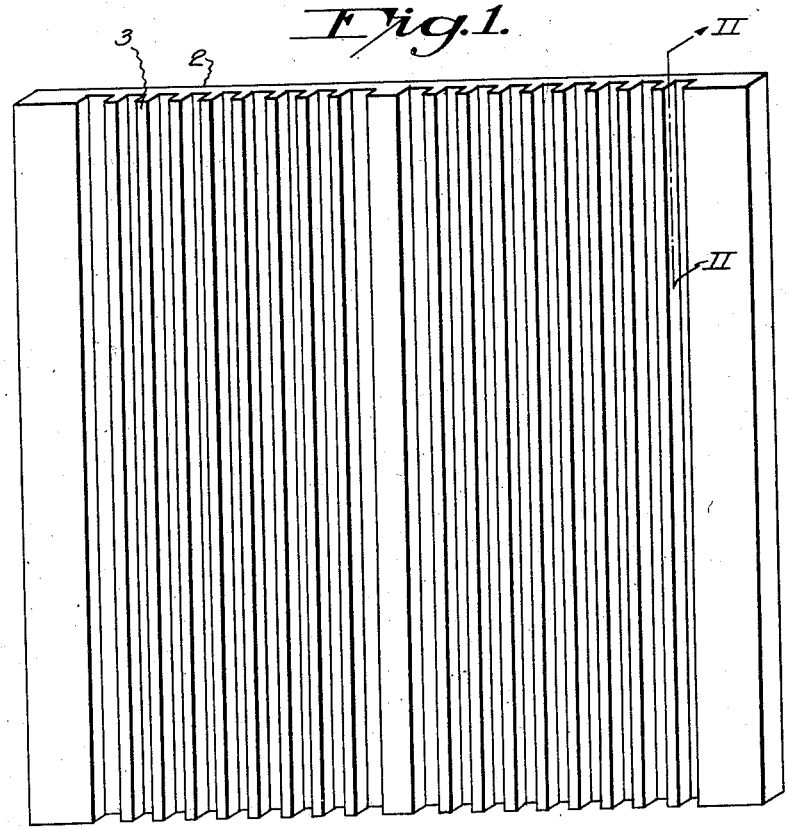
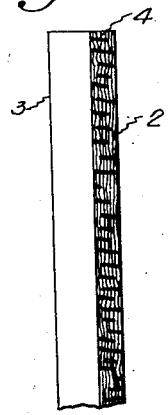
INVENTOR
William L. Kann, Patented Oct. 23, 1928.

1,688,336

UNITED STATES PATENT OFFICE.

WILLIAM L. KANN, OF PITTSBURGH, PENNSYLVANIA; THE BANK OF PITTSBURGH, N. A., ADMINISTRATOR OF SAID WILLIAM L. KANN, DECEASED.

BATTERY SEPARATOR.

Application filed November 15, 1927. Serial No. 233,383.

This invention relates to battery separators, and particularly battery separators made of wood. This application is a continuation in part of my application, Serial No. 159,748, filed January 7, 1927.

The woods heretofore employed for making storage battery separators have been of such character that it was necessary to subject them to the action of a bath solution, generally alkaline, so as to neutralize or counteract certain gums, acids, resins, pitches or other impurities which are naturally present in the wood. This must be done so as to eliminate any possibility of destructive chemical reactions being set up when acid is added to the battery, and also to ensure that no gums, resins or pitches will be deposited in the cell.

It is estimated that the woods which are now commonly used for battery separators, as for example, the Port Orford cedar, contain impurities or deleterious matter up to, say, thirty percent of the weight of the wood. The pretreatment generally given is not effective for removing all of this deleterious matter. In fact, it is estimated that only about one third of it is generally taken out. If the pretreatment is carried to such a point as to remove a substantial portion of the remaining deleterious matter there is great danger that the woody structure will be so seriously affected as to materially reduce the strength of the separator, and therefore the life of the battery.

There are number of material disadvantages in pretreatment. The separators are generally quite thin, and it is essential that they be kept in a wet or damp condition from the time they are taken from the treating bath until they are placed in the battery electrolyte. Unless they are kept wet or damp, they will become weakened, warped or split. This makes it difficult to ship and store the separators, and the problem becomes particularly acute if batteries are to be shipped long distances. In fact, under such circumstances it has been considered that the safest way of insuring that the battery unit will be in working condition on arrival is to ship the battery with separators and acid complete. This requires special handling and packing, and is also open to the objection that the battery slowly discharges and deteriorates while standing.

It is generally considered that battery separators made of wood permit circulation of the electrolyte because of osmosis, the wood separators acting as true diaphragms.

I have found that certain woods can be used as battery separators in their natural state, and without any pretreatment. Such woods have the necessary characteristics for long life, and when used will give a battery of suitable electric properties and having a long life. The separators may be cut from the wood in its natural state and need not be subjected to the pretreatment which is considered essential for the woods now used. They are therefore not subject to the warping or splitting which is common with pretreated separators. They may be shipped, handled and stored in the dry state. They will maintain their desirable qualities indefinitely, and battery repairs and separator replacements may be made at any place with a minimum of expense and inconvenience.

By using my improved separator, the component parts of a battery may be shipped, handled and stored separately, the acid being kept in suitable containers, and the battery readily assembled at any time and in any climate. If desired, the battery may be assembled and shipped in what is known as a "dry charge" condition.

The particular wood with which I have had the best results is the Virola or Myristica. This wood is found in the West Indies, Central America and South America, but principally in Dutch Guiana, where it is known under various names. It is sometimes termed Baboen or Booen, but is most widely known in this country as Kwatta wood. The wood also goes under such names as Banak, Sangre, Mahban, Atoba, Dalli and Petitrie.

Botanically the tree is designated as "V. surinamensis Warb". The wood runs in color from pink to pale brown and red. It is of light weight, but firm, and is coarse textured and straight grained. The Virola belongs to the Myristica family and all of the trees of the family are somewhat similar in appearance and characteristics.

The wood has all of the properties required for battery separators without the need of being subjected to a chemical treatment before use. In addition to the usual properties, it is peculiar in that it possesses lateral pores as distinguished from the vertical pores which are common to all woods. These pores extend generally radially of the tree and I prefer to cut the battery separators so that the lateral pores extend in a direction generally perpendicular, or at least at a considerable angle to the face of the separator. These pores are of particular value in battery separators because, to some extent, the electrolyte appears to pass through the separator by percolation rather than by pure osmosis. I do not limit myself to this theory, but tests have shown that the wood has superior qualities for battery separator work.

In the accompanying drawings which illustrate a battery separator made from Kwatta wood, Figure 1 is a front elevation of the separator, and Figure 2 is a transverse section to enlarged scale taken on the line II—II of Figure 1.

The separator shown in the drawings is of the usual form, comprising a body portion 2 having ribs 3 formed therein. The separator is so cut that the grain of the wood runs in the same direction as do the ribs 3. The vertical pores or sap channels, found in all woods, extend in this direction.

Figure 2 indicates more or less diagrammatically the lateral or transverse pores 4 which are peculiar to Kwatta wood.

It will be understood that the pores are very small although they are visible under a magnifying glass. Figure 2 is intended only to illustrate the pores in diagram and the direction in which it is desired that they shall extend in the completed battery separator.

The separators are so cut that these pores extend from one face of the separator toward the other in a direction generally perpendicular to the plane of the faces, or at least at a steep angle thereto. The wood may be cut in various ways, as for example, by rotary or veneer cutting methods or resawing, so as to achieve this result.

In certain cases it may be desirable to subject some of the other woods of the Myristica family, or woods having the characteristics thereof, to some pretreatment, although one great advantage of using Kwatta wood is that the ordinary treatment need not be resorted to.

When the woods ordinarily employed for battery separators are treated a number of the desirable qualities of the woods are necessarily sacrificed. As a result the separators which are produced from the treated woods deteriorate rather rapidly in service because of structural weaknesses. Separators made from untreated wood, such as Kwatta wood, do not have their structure impaired by pretreatment and therefore stand up better under service. In addition to this, separators made from Kwatta wood, or woods having similar characteristics, are superior to ordinary separators because of the presence of the lateral pores or channels.

I have described a preferred embodiment of my invention, but it will be understood that it is not limited thereto, but may be otherwise embodied within the scope of the following claims.

I claim:—

1. As a new article of manufacture, a battery separator made of wood of the Myristicaceæ family, and having characteristics suitable for battery separators.

2. As a new article of manufacture, a battery separator made of an untreated wood of the Myristicaceæ family and having characteristics suitable for battery separators.

3. As a new article of manufacture, a battery separator made of Virola or Kwatta wood.

4. As a new article of manufacture, a battery separator made of Virola or Kwatta wood in its natural state.

In testimony whereof I have hereunto set my hand.

WILLIAM L. KANN.